April 8, 1924.

G. E. BRENT

CANDY MACHINE

Filed May 29, 1922

INVENTOR:
George E. Brent.

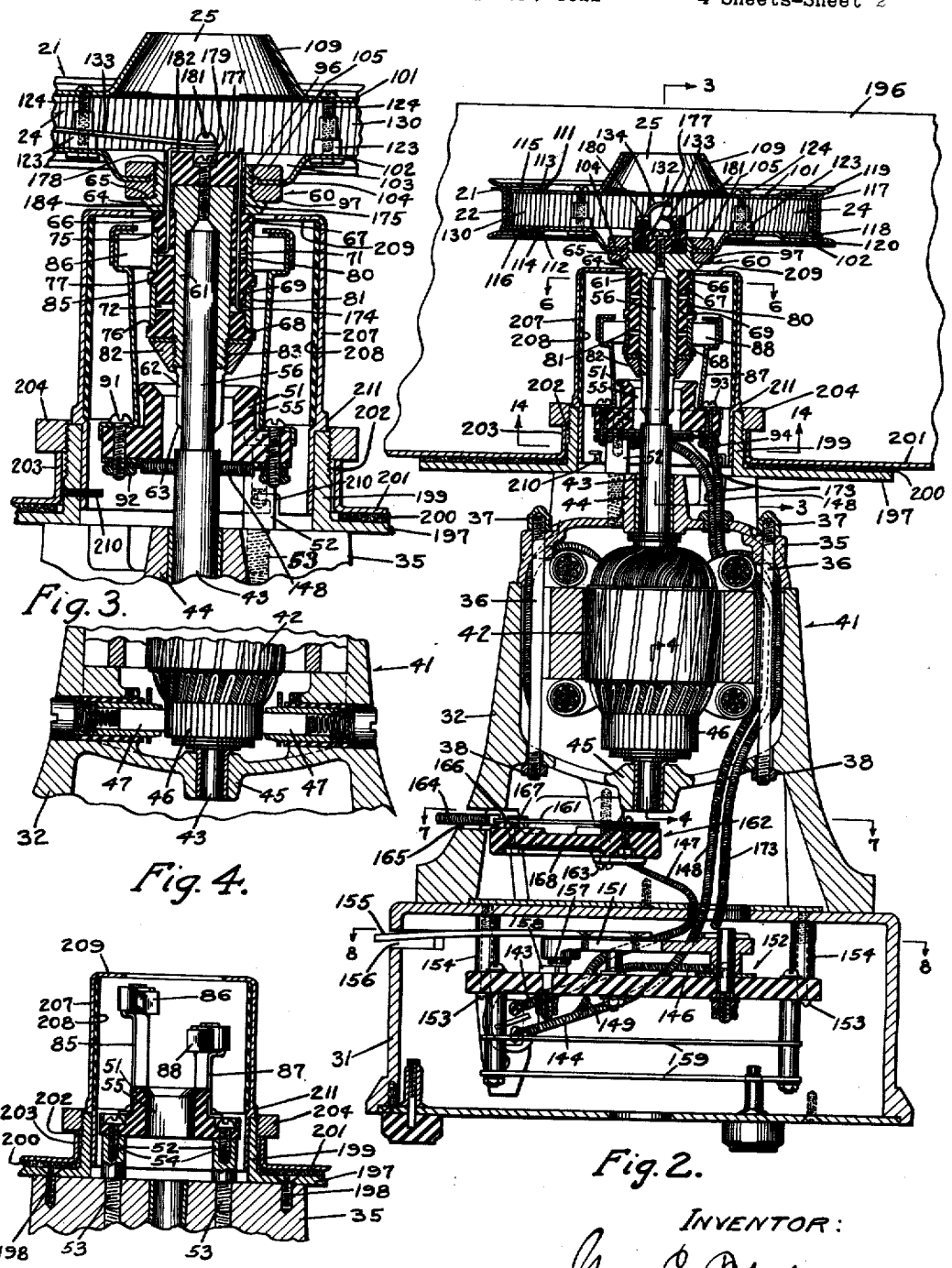

April 8, 1924.
G. E. BRENT
CANDY MACHINE
Filed May 29, 1922
1,489,342
4 Sheets-Sheet 3

INVENTOR:
George E. Brent

April 8, 1924.
G. E. BRENT
1,489,342
CANDY MACHINE
Filed May 29, 1922 4 Sheets-Sheet 4
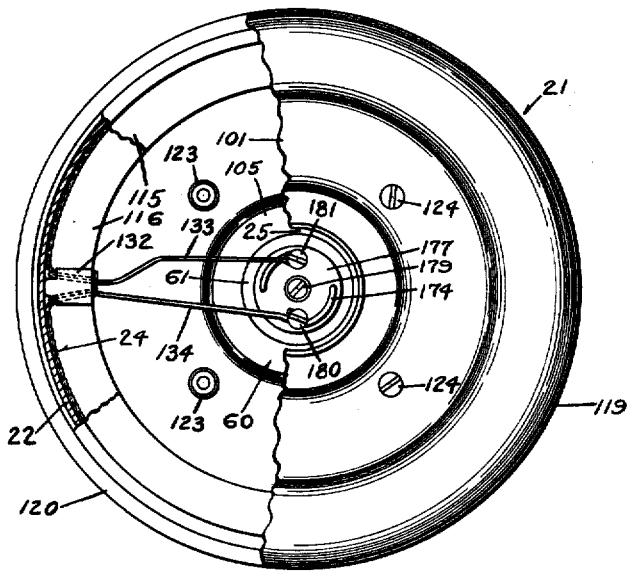
Fig. 10.
Fig. 12.
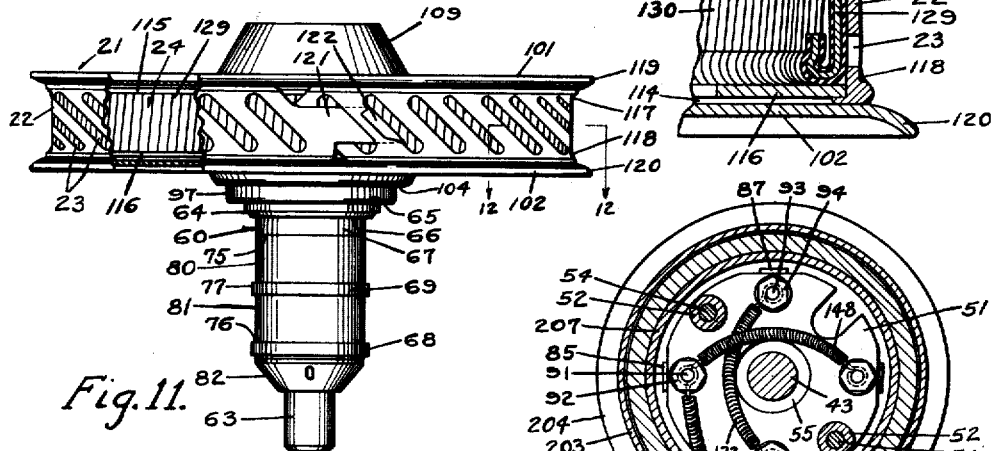
Fig. 11.
Fig. 13.
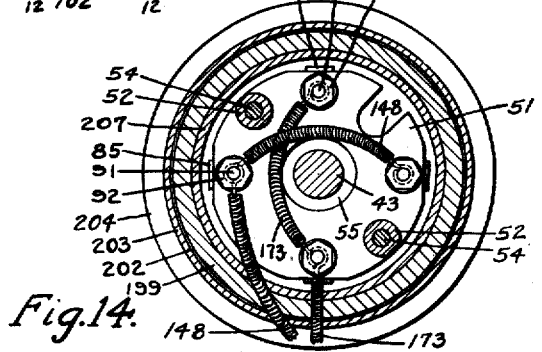
Fig. 14.
INVENTOR:
George E. Brent,
By his Attorney.

Patented Apr. 8, 1924.

1,489,342

UNITED STATES PATENT OFFICE.

GEORGE E. BRENT, OF NASHVILLE, TENNESSEE.

CANDY MACHINE.

Application filed May 29, 1922. Serial No. 564,531.

*To all whom it may concern:*

Be it known that I, GEORGE E. BRENT, a citizen of the United States, residing at Nashville, county of Davidson, and State of Tennessee, have invented certain new and useful Improvements in Candy Machines, of which the following is a specification.

My invention relates to candy machines employing a rotative vessel in which the ingredients of the candy are placed and heated to reduce the same to molten state and from which they are ejected by centrifugal force in threadlike filaments to produce so-called candy floss.

It is the object of my invention to provide new and improved means whereby the heating of the ingredients, which may, for instance, consist of sugar, is accomplished and the rotation of the vessel is obtained; further, to provide new and improved means whereby the relative speeds of rotation and heat applied are independently regulated; further, to provide novel arrangement and assembling of the parts whereby convenience of regulation is obtained; further, to provide novel means for conducting the electricity for the heating element and protecting the same from contact with the candy floss; further, to provide a new and improved rotating head and connections therefor for a machine of the character described; and, further, to provide new and improved arrangement of means for ejecting the melting ingredients in order to produce extremely thin threadlike strands of candy to produce an extremely light and fluffy candy floss.

The invention will be further readily understood from the following description and claims, and from the drawings, in which latter:

Fig. 2 is a vertical axial section of the same, taken in the plane of the line 2—2 of Fig. 8.

Fig. 3 is an enlarged vertical axial section of the upper end of the machine, partly broken away, taken in the plane of the line 3—3 of Fig. 2;

Fig. 4 is a detail of the commutator end of the electric motor, taken in vertical axial section in the plane of the line 4—4 of Fig. 2;

Fig. 5 is a vertical axial section of a detail of the brush-stands, taken in the plane of the line 5—5 of Fig. 6.

Fig. 10 is a plan view of the upper end of my improved device, partly broken away;

Fig. 11 is a side elevation of the head, partly broken away;

Fig. 12 is a detail of the heating element in the vessel, taken in horizontal section on the line 12—12 of Fig. 11;

Fig. 13 is a cross-sectional detail of the same, partly broken away;

Fig. 14 is a cross-sectional detail, taken in the plane of the line 14—14 of Fig. 2, to show the electric connections between the low brush-stands and the high brush-stands; and, Fig. 15 is a side elevation of the head, partly broken away, and partly in central axial section, showing a modification.

Figure 1:
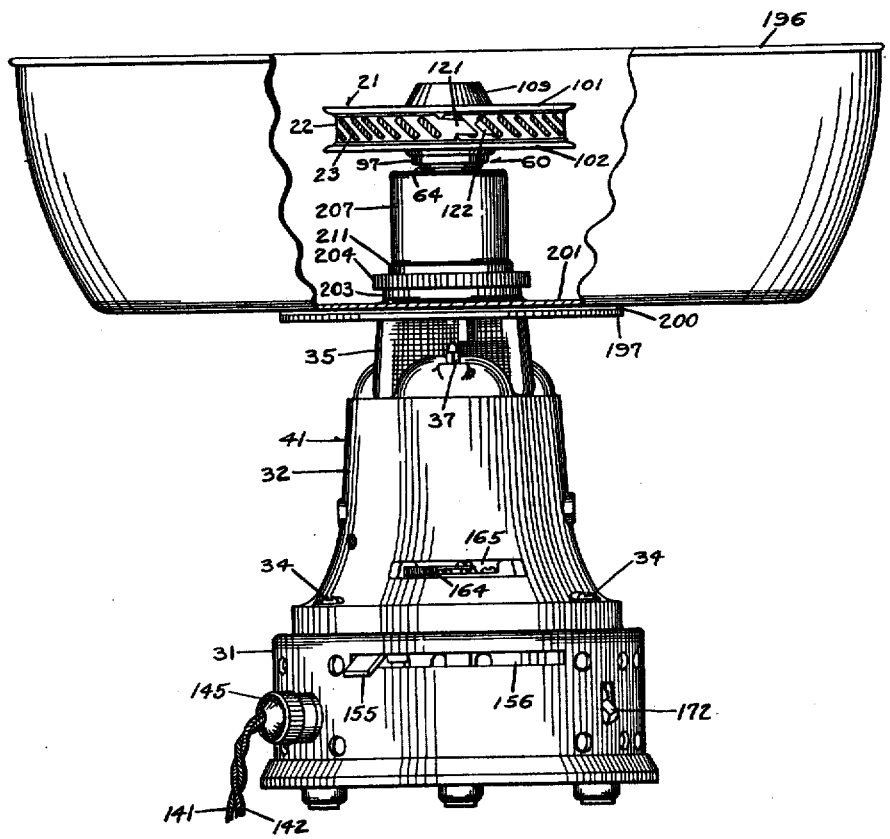
Fig. 1 is a front elevation of my improved device, with the bowl partly broken away for the exposure of the interior of the same.

My improved device is intended to convert candy ingredients, which may, for instance, be ordinary granulated sugar, or other ingredients, into silk-like threads to produce so-called candy floss.

The ingredients are introduced into a vessel 21, the peripheral wall 22 of which is provided with openings 23, the vessel being provided with an electric heating element 24. The ingredients are placed in the vessel through an opening 25.

The vessel is rotated, and while being rotated heat is supplied to the ingredients by means of the heating element, whereby the ingredients adjacent to the heating element are caused to melt and to be projected by centrifugal force, due to the rotation of the vessel, through interstices in the heating element and openings in the periphery of the vessel, to produce the silk-like strands of the candy floss.

Means are provided for independently regulating the heat of the heating element, and also for independently regulating the speeds of rotation of the vessel, so that the heat as well as the speed of the heating element may be independently regulated throughout the course of producing the candy floss, in order to provide the necessary amount of heat and the necessary speed of rotation, as the condition of the candy floss being ejected may suggest.

The frame of the machine preferably comprises a base 31 on which there is a pedestal 32, releasably secured to the base by screws 34. The pedestal may comprise a releasable top 35, held to the pedestal proper by bolts 36 and nuts 37, 38. The pedestal preferably comprises the casing of an electric motor 41.

This motor is in upright position, its rotating armature 42 being in upright position and comprising an armature shaft 43 journaled in bearings 44, 45. The commutator 46 of the electric motor has suitable brushes 47 complemental thereto.

An insulating spool 51 is supported on the pedestal, preferably in spaced relation thereto, for instance, by having stems 52 threaded into the upper end of the pedestal, as shown at 53, the insulating spool being supported on the tops of these stems and secured thereto by screws 54. The upright shaft extends upwardly through the bore 55 of the spool, and has an upward extension 56.

A head 60 is secured to the upward extension of the shaft, preferably in readily releasable relation. This head comprises the vessel 21 and a downwardly extending portion to which the vessel is secured, the downwardly extending portion being received over the upper end of the shaft and having portions of the electric connections for the heating element in the vessel thereon.

Thus the downward extension comprises a bushing 61, the lower end of which is provided with slots 62 to form fingers 63 frictionally contacting the shaft and frictionally holding the head to the shaft, and providing for ready upward removal of the head and ready attaching of the head about the shaft.

The upper end of this bushing, which may be of metal, is provided with an annular flange 64, forming an annular shoulder 65 at its top and an annular shoulder 66 at its bottom. End insulating sleeves 67, 68, and an intermediate insulating sleeve 69 are received about the bushing and preferably have annular spaces 71, 72, between them. The upper insulating sleeve is provided with an annular shoulder 75, the lower insulating sleeve is provided with an annular shoulder 76, and the intermediate insulating sleeve is provided with an annular rib 77, forming annular shoulders respectively at its top and at its bottom.

Rings 80, 81, are received in the annular recesses formed respectively between the upper annular shoulder and the rib, and between the rib and the lower annular shoulder. These rings are electro-conductive contact-rings. The rings and the sleeves are clampingly secured to the bushing by means of a nut 82 threaded about the lower threaded end 83 of the bushing for clamping the insulating sleeves with the contact-rings therebetween, between the shoulder 66 and the nut.

A pair of brush-stands 85 are provided with brushes 86, arranged to contact the contact-ring 80. A pair of brush-stands 87 are provided with brushes 88, arranged to contact the contact-ring 81. The brush-stands 85 are the longer of the brush-stands to coact with the upper contact-ring, and the brush-stands 87 are the shorter brush-stands to coact with the lower contact-ring.

The longer brush-stands 85 are secured to the insulating spool 51 by means of screws 91 and nuts 92, the screws and nuts also acting as binding posts. The shorter brush-stands are secured to the insulating spool 51 by means of screws 93 and nuts 94, the screws and nuts also serving as binding posts.

The upper end of the bushing 61 is threaded, as shown at 96, and has a nut 97 received thereover, the nut arranged to contact the shoulder 65. The vessel 21 comprises an upper plate 101 and a lower plate 102. The lower plate is provided with a central depression 103, at the bottom of which there is an inwardly extending radial flange 104, arranged to rest upon the nut 97. A second nut 105 is threaded over the threaded end of the bushing and is arranged to clamp the flange 104 between said nuts and to center said lower plate about the bushing.

The upper plate is provided with the central opening 25, through which the charge of ingredients or sugar is arranged to be passed into the vessel. The upper plate is provided with an upwardly slanting central wall 109, at the upper end of which the opening 25 is located, this wall slanting downwardly and outwardly from the opening in order to lead the charge being supplied toward the periphery of the vessel, in case the centrifugal force of the rotating vessel acts upon the charge while being supplied.

The upper plate and the lower plate are respectively provided with outwardly extending annular bends 111, 112, to form annular rabbets 113, 114, between said plates.

The peripheral wall 22 is formed by an annular peripheral plate, located between the upper plate and the lower plate, preferably at the edges of the latter, this peripheral plate being provided with the openings 23, shown extending slantingly across said outer peripheral plate. This peripheral plate is preferably provided with inwardly radially extending flanges 115, 116, respectively at the top and at the bottom of the peripheral plate. These flanges and the upper and lower edges of the peripheral plate are located in the annular rabbets 113, 114.

The peripheral plate is preferably provided with slanting edges 117, 118, at its top and bottom, preferably located respectively above and below said opening. Annular lips 119, 120, are preferably located at the outside of the peripheral plate at the top and at the bottom of the latter, shown formed by bending the peripheral edges of the upper plate and the lower plate respectively. This construction forms an annular mouth for the rotating vessel, which has a tendency to cause the candy floss to spread up and down as the same is ejected by centrifugal force from the vessel.

The peripheral plate and its flanges are preferably formed as an annular structure, the respective ends whereof are connected by providing a tongue 121 at one end of said structure received through openings 23 adjacent the other end of said structure, the end of said tongue being bent as a clip 122 upon the wall between said openings.

Nuts 123 and bolts 124 are arranged to draw the upper plate and lower plate toward each other, and thereby clamp the peripheral member between them.

An annular heating element 24 is provided for the head, and is shown formed up out of a strip of electric resistance material provided with a suitable insulating coating 128, and bent as a flat spiral structure to form downwardly slanting stretches 129 and upwardly slanting stretches 130, slanting with relation to each other and connected at their tops and bottoms by reverse bends in the strip. The respective ends of the strip are respectively located in and positioned in spaced relation by a block 132 of insulating material, the ends of the strip extending toward the middle of the vessel as electric conductors 133, 134, where electric connection is made with the same.

The stretches of the heating element have narrow slots 135, 136, between them, which register at portions of their heights and form apertures through which the molten candy is projected, numbers of these apertures coinciding with the openings 23 in the peripheral plate. The heating element is flexible and is annularly received at the inside of the peripheral plate, being preferably located in the peripheral plate structure. The centrifugal force acting upon the heating element during the rotation of the vessel causes the heating element to be urged toward said peripheral plate and to be held by said peripheral plate.

Electric current is supplied to the device from a suitable source of electric energy by means of the electric conductors 141, 142, releasably connecting with the electric connections 143, 144, by means of a suitable electric plug 145.

The electric conductor 143 is electrically connected with electric conductors 146, 147. The electric conductor 144 is electrically connected with electric conductors 148, 149. The electric conductor 146 is electrically connected with the electro-conductive arm 151 of an electric rheostat 152 secured in the base 31 of the machine, as by means of screws 153 passing through posts 154 into the upper wall of the base. This arm of the rheostat is provided with an insulating handle 155, which passes outwardly through a slot 156 in the front of the base of the machine. The arm is provided with an electric contact 157 arranged to make electric contact with suitable buttons 158, suitably connected with the resistances 159 of the rheostat. The button 160 may be neutral.

The electric conductor 147 makes electric connection with the electro-conductive arm 161 of an electric rheostat 162, suitably secured in the lower portion of the pedestal 32 of the machine, as by means of screws 163 threaded into the frame of the pedestal. The arm 161 is provided with an insulating handle 164 extending through a slot 165 in the front of the lower portion of the pedestal. The arm is provided with an electric contact 166 arranged to make electric contact with suitable buttons 167, with which suitable resistances 168 of the rheostat makes connection. The button 169 may be neutral.

The rheostat 152 is exemplified as the rheostat for regulating the heat of the heating element, and the rheostat 162 is exemplified as the rheostat for regulating the speeds of rotation of the electric motor. These rheostats are secured in superposed relation below the upright electric motor, so that preferably the rheostats, the electric motor and the head are arranged in superposed relation.

An electric conductor 171 connects with the rheostat 152 and with one terminal of an electric switch 172, an electric conductor 173 connecting the other terminal of said electric switch with the binding posts 93, 94 of the shorter brush-stands 87, a portion of said electric conductor connecting said shorter brush-stands with each other. The brushes 88 of said brush-stands electrically contact the contact-ring 81. An electric conductor 174 is electrically connected with said contact-ring (see Fig. 3), and passes through apertures in the intermediate insulating sleeve 69 and the upper insulating sleeve 67 and through an insulating bushing 175 in the flange 64 of the bushing 61 and through an aperture in an insulating block 177 received in an upper recess 178 in said bushing 61. The insulating block is secured to the bushing 61 by a screw 179. The electric conductor 174 is at its upper end electrically connected with a terminal post 180 in said block. The electric conductor 134, extending inwardly from one end of the heating element, is also electrically connected with said terminal post.

The other inwardly extending electric conductor 133, extending from the other end of said heating element, is electrically connected with a terminal post 181 in said insulating block 177, an electric conductor 182 also connecting with said terminal post and passing through an aperture in said insulating block, an insulating bushing 184 in the flange 64 of the bushing 61, and through an aperture in the upper insulating sleeve 67, being then connected with the upper contact-ring 80, (see Fig. 3). The brushes 86 of the longer brush-stands are arranged to make electric contact with said contact-ring. The lower ends of said brush-stands are electrically connected by means of the terminal posts 91, 92, with the electric conductor 148, a portion of which extends between said terminal posts.

An electric conductor 191 is connected at one end with the end one of the buttons of the rheostat 162, and at its other end with one of the brushes 47 of the electric motor. The other brush of said electric motor has electric connection with an electric conductor 192, which may have connection with a suitable binding post 193 of the rheostat 162, and lead thence as the electric conductor 149.

The handles 155, 164, of the rheostats 152, 162, are conveniently placed at the front of the machine in superposed relation, so that both the heat of the heating element and the speed of rotation of the head may be relatively regulated independent of each other, and, if desired, the electric current for the heating element may be instantly interrupted or connected by means of the switch 172, also conveniently placed adjacent to the front of the machine, so that, if desired, the heat of the heating element may be instantly cut off while the rotation of the head continues, or again connected, according to the requirements of trade for always providing a fresh supply of candy floss in the bowl and preventing burning of the candy. The ejection of the ingredients from the vessel by centrifugal force takes place only while said ingredients are in molten condition; as the slots or interstices between the strands of the heating element are too narrow to permit the passage of the ingredients in unmolten state.

A bowl 196 surrounds the head and is arranged to receive the candy which is ejected by the head. An annular shelf 197 is provided at the top of the pedestal, being secured thereto by screws 198. The shelf is provided with an inner upwardly extending annular flange 199. A pad 200 is arranged to be received on the shelf. The bottom 201 of the bowl is provided with an opening 202 at its middle, the bottom being upturned to form an annular flange 203 at said opening. The outer face of the flange 199 of the shelf is threaded and is arranged to have a nut 204 received thereover for contacting the flange 203 of the bowl and securely clamping the bowl between the shelf and its pad and said nut, and also centering the bowl upon the pedestal.

A shell 207 is received about the lower extension of the head and the electric contacts thereat. It is provided with an inner annular insulating lining 208 and with an upper inwardly extending radial flange 209 for substantially closing the space about the lower portion of said head. The lower end of the shell is received within the flange 199 and is connected therewith, as by means of bayonet slot and pin joints 210, an annular shoulder 211 of the shell contacting the upper end of the flange 199 for securely holding the shell in place. The shell protects the parts enclosed thereby from contact with the candy floss formed in the bowl, and insures proper electric conductivity of the electric contacts therein for the rotating electric heating element.

Figure 15:
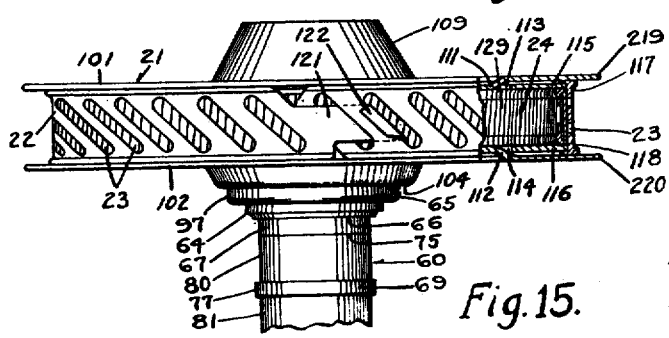
Figures 6, 7, 9:
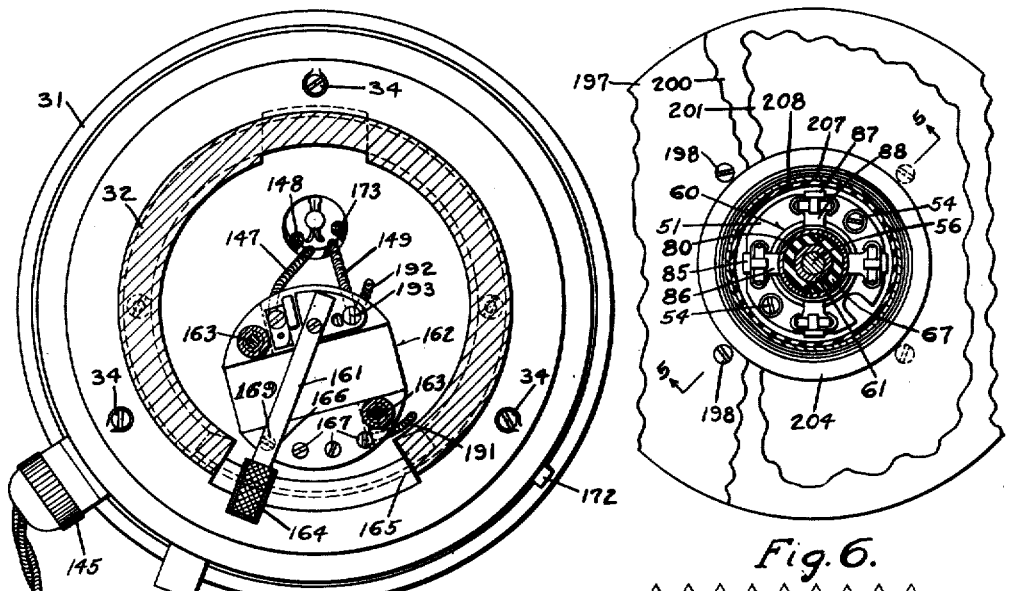
Fig. 6 is a cross-section of the same, taken in the plane of the line 6—6 of Fig. 2.
Fig. 7 is a horizontal cross-section of my improved device, taken on the line 7—7 of Fig. 2. and showing the rheostat for the electric connections of the electric motor.
Fig. 9 is a diagrammatic representation of the electric circuits.
Figure 8:
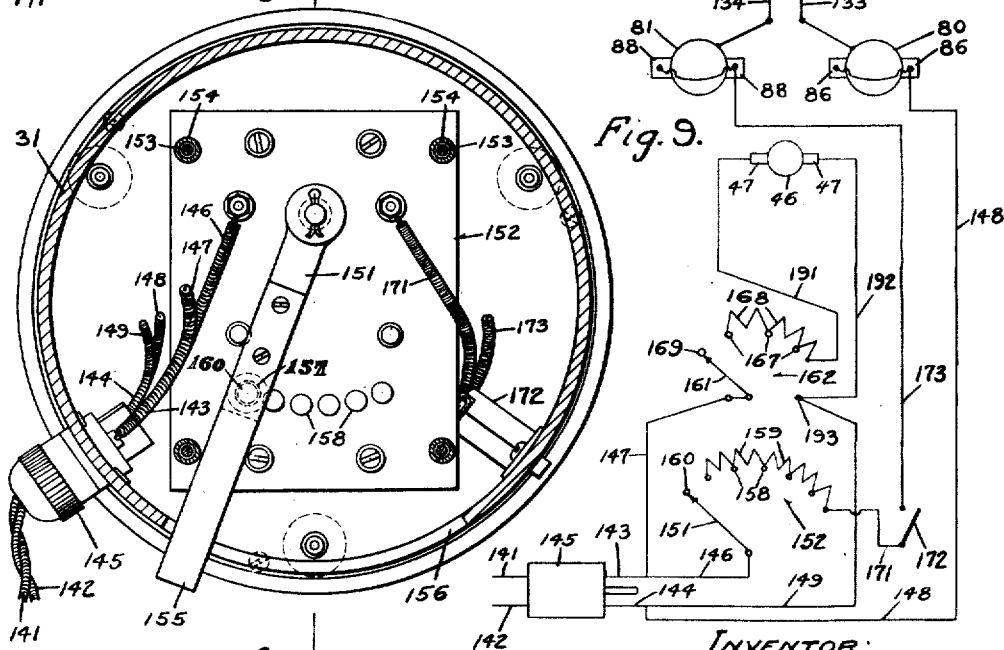
Fig. 8 is a horizontal cross-section of my improved device, taken on the line 8—8 of Fig. 2, and showing the rheostat in the electric connections for the heating circuit.

I have found that it is also desirable to eject the candy floss from the openings in the periphery of the head in substantially straight lines, and to counteract the spreading action up and down of the candy floss, as thereby a better control of the same is had within the bowl, especially when a shallow bowl is employed. When this is desired, I form the lips at the periphery of the head so as to extend in substantially parallel planes beyond the peripheral wall of the head in which the openings are located, and substantially perpendicular to the axis of rotation of the head, as more fully shown at 219, 220, in Fig. 15. I find that the combination of a low wide-mouthed infeeding funnel, as shown by the upwardly slanting central frusto-conical wall 109, in connection with the substantially straight lips 219, 220, to control the ejection of the candy floss, produce a very superior candy floss of extremely neat and pure appearance, when ejected into the bowl, the arrangement being such as to control the ejection with the limits of a comparatively shallow bowl, so as to avoid the projection of the candy floss beyond the rim of the bowl.

Having thus fully described my invention, what I claim as new, and desire to secure by Letters Patent, is:

1. In a candy machine of the character described, the combination of a rotatable head, an electric motor for rotating said head, a rotatable electric heating element at said head rotating with said head, electric connections from a source of electricity for said electric motor including a rheostat, electric connections from a source of electricity for said heating element including brushes and rotatable electric contacts therefor adjacent to said head, said last-named electric connections including a rheostat, and means for independently operating said rheostats for adjustably controlling the speeds of rotation and the heat of said heating element with relation to each other and independent of each other, so as to provide various speeds of rotation for said head and said rotatable electric heating element and various degrees of heat for said rotatable electric heating element at each of the speeds of the latter.

2. In a candy machine of the character described, the combination of a frame comprising a base and a pedestal mounted thereon, an upright electric motor in said pedestal having a rotatable armature, an upright shaft operated thereby, a rotatable head at the upper end of said shaft above said pedestal, said rotatable head including a rotatable electric heating element, electric connections for said electric motor including a rheostat, electric connections for said electric heating element including a rheostat, means for supporting said rheostats respectively in said pedestal and said base in superposed relations under said electric motor, and means extending to outside said pedestal and said base respectively for independently operating said rheostats for adjustably controlling the speeds of rotation and the heat of said heating element with relation to each other and independent of each other, so as to provide various speeds of rotation for said head and said rotatable electric heating element and various degrees of heat for said rotatable electric heating element at each of the speeds of the latter.

3. In a candy machine of the character described, the combination of a pedestal, an upright electric motor mounted therein comprising an upright armature-shaft extending above said pedestal, an annular insulating sleeve-like support surrounding said shaft, means for supporting said support at the upper end of said pedestal, a rotatable head comprising a rotatable heating element and rotatable annular electric contacts, brush-stands secured to said annular insulating support, brushes thereon for said rotatable annular electric contacts, and means securing said head to the upper end of said shaft.

4. In a candy machine of the character described, the combination of a frame, an upright electric motor mounted therein, an upright shaft rotated by said motor and extending upwardly therefrom, an insulating spool about said shaft supported by said frame in spaced relation from said frame, a rotatable head comprising a rotatable vessel and an annular electric heating element therefor arranged to discharge candy floss by centrifugal force, said head comprising an insulating sleeve about said shaft under said vessel, a pair of electric contact-rings on said sleeve, brush-stands of different heights including brushes for said respective contact-rings, means for securing the lower ends of said brush-stands to said insulating spool, a bowl positioned on said frame about said contact-rings and said brush-stands to receive said candy floss, and a shell within said bowl protectingly received about said contact-rings and said brush-stands.

In testimony whereof, I have hereunto signed my name in the presence of two subscribing witnesses:

GEORGE E. BRENT.

In presence of—
PAUL V. CONNOLLY,
DELMA WERNSING.